(12) United States Patent
Wagner et al.

(10) Patent No.: US 7,825,045 B1
(45) Date of Patent: *Nov. 2, 2010

(54) ADVANCED BODY ARMOR

(75) Inventors: Norman J. Wagner, Newark, DE (US); Eric D. Wetzel, Baltimore, MD (US)

(73) Assignee: University of Delaware, Newark, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 12/370,669

(22) Filed: Feb. 13, 2009

Related U.S. Application Data

(60) Division of application No. 10/557,312, filed as application No. PCT/US2004/015813 on May 18, 2004, now Pat. No. 7,498,276, which is a continuation of application No. 10/441,655, filed on May 19, 2003, now Pat. No. 7,226,878.

(51) Int. Cl.
*B32B 27/04* (2006.01)

(52) U.S. Cl. ............................. 442/59; 2/2.5

(58) Field of Classification Search ................ 2/2.5; 428/911, 912; 442/59, 97, 101, 103, 134, 442/135, 148, 149, 168
See application file for complete search history.

(56) References Cited

U.S. PATENT DOCUMENTS

| | | | |
|---|---|---|---|
| 1,213,118 | A | 1/1917 | Lynch |
| 3,649,426 | A | 3/1972 | Gates, Jr. |
| 3,833,952 | A | 9/1974 | Rosenberg |
| 4,425,080 | A | 1/1984 | Stanton et al. |
| 4,503,952 | A | 3/1985 | Hesse |
| 4,522,871 | A | 6/1985 | Armellino, Jr. et al. |
| 4,613,535 | A | 9/1986 | Harpell et al. |
| 4,759,428 | A | 7/1988 | Seshimo |
| 4,953,234 | A | 9/1990 | Li et al. |
| 5,035,111 | A | 7/1991 | Hogenboom et al. |
| 5,175,040 | A | 12/1992 | Harpell et al. |
| 5,354,605 | A | 10/1994 | Lin et al. |
| 5,395,671 | A | 3/1995 | Coppage, Jr. et al. |
| 5,595,809 | A | 1/1997 | Dischler |
| 5,712,011 | A | 1/1998 | McMahon et al. |
| 5,776,839 | A | 7/1998 | Dischler et al. |
| 5,854,143 | A | 12/1998 | Schuster et al. |
| 6,219,842 | B1 | 4/2001 | Bachner, Jr. |
| 6,342,280 | B1 | 1/2002 | Patrick et al. |
| 6,701,529 | B1 | 3/2004 | Rhoades et al. |
| 6,913,802 | B1 | 7/2005 | Plant |
| 2002/0171067 | A1 | 11/2002 | Jolly et al. |
| 2004/0171321 | A1 | 9/2004 | Plant |
| 2004/0173422 | A1 | 9/2004 | Deshmukh et al. |
| 2005/0037189 | A1 | 2/2005 | Palmer et al. |
| 2005/0282007 | A1 | 12/2005 | Sauer et al. |
| 2005/0282450 | A1 | 12/2005 | Sauer et al. |
| 2007/0029690 | A1 | 2/2007 | Green et al. |

FOREIGN PATENT DOCUMENTS

| | | |
|---|---|---|
| GB | 2349798 | 11/2000 |
| WO | WO-00/46303 | 8/2000 |
| WO | WO-03/022085 | 3/2003 |
| WO | WO-03/055339 A2 | 7/2003 |
| WO | WO-2004/012934 | 2/2004 |
| WO | WO-2005/000966 | 1/2005 |

OTHER PUBLICATIONS

Sughir S. Shenoy, "Eletric Field Effects on The Rheology Of Shear Thickening Colloidal Dispersions", Fall 2003.
Barnes, "Shear-Thickening ("Dilatancy") in Suspensions of Nonaggregating Solid Particles Dispersed in Newtonian Liquids", Journal of Rheology 33(2), 329-366 (1989).
Bender et al., "Optical Measurement of the Contributions of Colloidal Forces to the Rheology of Concentrated Suspensions", Journal of Colloid and Interface Science 172, 171-184 (1995).
Bender et al., "Reversible shear thickening in monodisperse and bidisperse colloidal dispersions", J. Theol. 40(5), 899-916 Sep./Oct. 1996.
Bossis et al., "The rheology of brownain suspensions", J. Chem. Phys. 91(3), 1866-1874, Aug. 1, 1989.
Catherall et al., "Shear thickening and orser-sisorder effects in concentrated colloids at high shear rates", J. Rheol. 44(1), 1-25, Jan./Feb. 2000.
D'Haene et al., "Scattering Dichroism Measurements of Flow-Induced Structutre of a Shear Thickening Suspension", Journal of Colloid and Science 156, 350-358 (1993).
Foss et al., "Structure diffusion and rheology of Brownian suspensions by Stokesian Synamics simulation", J. Fluid Mech. 407, 167-200 (2000).
Helber et al., "Vibrations Attenuation by Passive Stiffness Switching Mounts", Journal of Sounfd and Vibrations 138(1), 47-57 (1990).
Hoffman, "Discontinuous and Dilaranr Vixcosity Behavior in Concentrated Suspensions", Journal of Colloid and Interface Science 46(3), 491-506 (Mar. 1974).

(Continued)

*Primary Examiner*—Arti Singh-Pandey
(74) *Attorney, Agent, or Firm*—Connolly Bove Lodge & Hutz LLP

(57) ABSTRACT

An armor composite material has been invented which contains a fabric which has been impregnated with shear thickening fluid. This invention offers a ballistic resistant material that is more flexible and less bulky than comparable, conventional ballistic fabric. The material in the alternative can be puncture resistant. The invented material offers superior ballistic performance and/or puncture resistance compared to conventional ballistic fabric-based materials of equal thickness. The invented material can be applied to applications requiring armor that is compact and/or flexible, such as body armor, protective clothing and flexible protective devices and shields, and stab resistant clothing and devices.

18 Claims, 2 Drawing Sheets

OTHER PUBLICATIONS

Kaffashi et al., "Elastic-Like and Viscous-Like Components of the Shear Viscosity for Nearly Hard Sphere, Brownian Suspensions", Journal of Colloid and Interface Science 187, 22-28 (1997).

Laun et al., "Rheology of extremely shear thickening polymer dispersions (passively viscosity switching fluids)", J. Rheol 35(6), 999-1034 (Aug. 1991).

Laun et al., Rheological and small angle neutron scattering investigation of shear-induced particle structures of concentrated polymer dispersions submitted to plane Poiseuille and Couette flow, J. Rheol. 36(4), 743-787 (May 1992).

Lee et al., "The Rheological Properties of CLay Suspensions, Latexes and Clay-Latex Systems", Tappi Coating Conference, 201-231 (1972).

Lee et al., "Dynamic properties of shear thickening colloidal suspensions", Rheologica Acta, 1-19 (2003).

Lee et al., "The ballistic impact charateristics of Kevler woven fabrics impregnated with a colloidal shear thickening fluid", J. Mat. Sci., 1-38 (Sep. 2002).

Maranzano et al., "Flow-small angle neutron scattering measurements of colloidal dispersion microstructure evolution through the shear thickening transition", Journal of Chemical Physics 117(22), 10291-10302 (Dec. 8, 2002).

Maranzano et al., "The effects of particle size on reversible shear thickening of concentrated colloidal dispersions", Journal of Chemical Physics 114(23), 10514-10527 (Jun. 15, 2001).

Maranzano et al., "The effects of interparticle interactions and particle size on reversible shear thickening: Hard-sphere colloidal dispersions", J. Rheol. 45(5), 1205-1222 (Sep./Oct. 2001).

Newstein et al., "Microstructural changes in a colloidal liquid in the shear thinning and shear thickening regimes", Journal of Chemical Physics 111(10), 4827-4838 (Sep. 8, 1999).

Egres et al., "Novel Body Armor Utilizing Shear Thickening Fluid (STF) Composites", ICCM-14 (San Diego) Conference Proceedings (Jun. 2003).

Lee et al., "Advanced Body Armor Utilizing Shear Thickening Fluids", 23 US Army Research Conference (Orlando FL) Proceedings (Nov. 2002).

ADVANCED BODY ARMOR

CROSS-REFERENCE TO RELATED APPLICATIONS

This application is a divisional application of U.S. Ser. No. 10/557,312, filed Jan. 31, 2006 which is the National Stage of PCT/US04/015813 which claims benefit to U.S. application Ser. No. 10/441,644, filed May 19, 2003.

GOVERNMENT LICENSE RIGHTS

The United States Government has rights in this invention as provided for by Army Research Laboratories, CMR contract nos. DAAD19-01-2-0001 and DAAD19-01-2.-0005.

BACKGROUND OF THE INVENTION

Body armor is essential equipment for police and military. Currently, body armor is fielded only in specific high-risk scenarios, and is typically limited to chest and head protection. However, a significant percentage of battlefield injuries occur to the extremities, including arms, legs, hands, and neck. Armor for these extremities must offer protection from fragment and ballistic threats, without significantly limiting soldier mobility and dexterity.

Conventional body armor materials are typically comprised of many layers of polyaramid poly(phenylene diamine terephthalamide) fabric, sold by DuPont under the registered name of Kevlar®, with optional ceramic tile inserts. These materials are too bulky and stiff for application in extremities protection. A material is needed which can offer the equivalent ballistic performance of existing body armor materials, but with significantly more compactness and flexibility.

Shear thickening is a non-Newtonian flow behavior often observed in concentrated colloidal dispersions, and characterized by a large, sometimes discontinuous increase in viscosity with increasing shear stress (Lee and Reder, A. S. *TAPPI Coating Conference Proceedings*, p. 201, 1972; Hoffman, R. L., *J. Colloid Interface Sci.*, Vol. 46, p. 491, 1974; Barnes, H. A., *J. Rheol.*, Vol. 33, p. 329, 1989). It has been demonstrated that reversible shear thickening in concentrated colloidal suspensions is due to the formation of jamming clusters resulting from hydrodynamic lubrication forces between particles, often denoted by the term "hydroclusters" (Bossis and Brady, *J. Chem. Phys.*, Vol. 91, p. 866, 1989; Foss and Brady, *J. Fluid Mech.*, Vol. 407, p. 167, 2000; Catherall et al., *J. Rheol.*, Vol. 44, p. 1, 2000). The mechanism of shear thickening has been studied extensively by rhea-optical experiments (D'Haene et al., *J. Colloid Interface Sci.*, Vol. 156, p. 350, 1993; Bender and Wagner, *J. Colloid Interface Sci.*, Vol. 172, p. 171, 1995), neutron scattering (Laun et al., J. Rheol., Vol. 36, p. 743, 1992; Bender and Wagner, *J. Rheol.*, Vol. 40, p. 899, 1996; Newstein, et al., *J. Chem. Phys.*, Vol. 111, p. 4827, 1999; Maranzano and Wagner, *J. Rheol.*, Vol. 45, p. 1205, 2001a; Maranzano and Wagner, *J. Chem. Phys.*, 2002) and stress jump theological measurements (Kaffashi et al., *J. Colloid Interface Sci.*, Vol. 181, p. 22, 1997). The onset of shear thickening in steady shear can now be quantitatively predicted (Maranzano and Wagner, *J. Rheol.*, Vol. 45, p. 1205, 2001a, and Maranzano and Wagner, *J. Chem. Phys.*, Vol. 114, p. 10514, 2001) for colloidal suspensions of hard-spheres and electrostatically stabilized dispersions. This shear thickening phenomenon can damage processing equipment and induce dramatic changes in suspension microstructure, such as particle aggregation, which results in poor fluid and coating qualities. The highly nonlinear behavior can provide a self-limiting maximum rate of flow that can be exploited in the design of damping and control devices (Laun et al., *J. Rheol.*, Vol. 35, p. 999, 1991; Helber et al., *J. Sound and Vibration*, Vol. 138, p. 47, 1990).

The general features of containment fibers for use in energy dissipating fabrics are high tenacity and high tensile modulus. These materials are also considered ballistic materials. At the same time, in many applications, it may be desirable to utilize a fabric having the benefits of relative low bulk and flexibility. To achieve such properties, polymeric fibers may be used. The fibers which may be preferred include aramid fibers, ultra-high molecular weight polyethylene fiber, ultra-high molecular weight polypropylene fiber, ultra-high molecular weight polyvinyl alcohol fiber and mixtures thereof. Typically, polymer fibers having high tensile strength and a high modulus are highly oriented, thereby resulting in very smooth fiber surfaces exhibiting a low coefficient of friction. Such fibers, when formed into a fabric network, exhibit poor energy transfer to neighboring fibers during an impact event. This lack of energy transfer may correlate to a reduced efficiency in dissipating the kinetic energy of a moving object thereby necessitating the use of more material to achieve full dissipation. The increase in material is typically achieved through the addition of more layers of material which has the negative consequence of adding to the bulk and weight of the overall fabric structure.

Among the most common uses for these so-called containment fabrics are in the use of body armor, and windings surrounding the periphery of turbine engines such as those found on commercial aircraft. Such an application is disclosed in U.S. Pat. No. 4,425,080 to Stanton et al. the teachings of which are incorporated herein by reference. The fabric is intended to aid in the containment of a projectile which may be thrown outwardly by rotating parts within the engine in the event of a catastrophic failure.

While the overall energy dissipating capacity of the fabric windings surrounding the engine is important, minimizing the thickness of the windings is also critical. Furthermore, economic considerations dictate that the number of fabric layers utilized for this purpose cannot be excessive. Thus, an effective containment structure should not require an excessive number of fabric layers to achieve the necessary levels of energy containment. It has been determined that the seemingly conflicting goals of improved kinetic energy containment and reduced material layers can, in fact, be achieved by improving the energy transfer between the adjacent fibers or yarns at the location of impact in the fabric network.

Several techniques are known for increasing the energy transfer properties between fibers or yarns but each of these known techniques has certain inherent deficiencies. One known method is to roughen the surface of the fibers or yarns by sanding or corona treatment. However, such roughening is believed to have limited utility due to the resultant degradation in the fiber.

Another method of increasing energy transfer between adjacent fibers or yarns is to coat the fabric with a polymer having a high coefficient of friction. One deficiency in this practice is the formation of fiber-to-fiber bonds. Such bonding may result in stress reflections at yarn crossovers during impact by a moving article, which cannot be transferred away from the impact region. Another deficiency is the large weight gain typical of coatings, which may be ten percent or more. A further limitation of this approach is a significant decrease in fabric flexibility due to the addition of the relatively stiff polymer coating. A related method is to use a sticky resin that creates adhesion between the fibers, as disclosed in U.S. Pat. No. 1,213,118 to Lynch, but this technique has the same inherent deficiencies of fiber to fiber bonding and increased weight as exhibited by coatings.

Yet another method for improving the energy transfer between fibers or yarns in a containment fabric is core spinning of high strength fibers in combination with weaker fibers having a higher coefficient of friction as disclosed in U.S. Pat. No. 5,035,111 to Hogenboom. However, these relatively high friction fibers may reduce the overall fabric strength.

Dischler et al. (U.S. Pat. No. 5,776,839) used Kevlar® fibers coated with a dry powder that exhibits dilatant properties. Dilatant properties refer to increases in both volume and viscosity under flow. In their work, the fibers demonstrated an improved ability to distribute energy during ballistic impact due to the enhanced inter-fiber friction.

Schuster et al (U.S. Pat. No. 5,854,143) also describe the use of dry dilatant agents in a fabric carrier to improve ballistic protection. In their approach, the dilatant agent is a polymeric powder which is applied to the fabric while suspended in a carrier fluid, and subsequently dried to leave behind the dilatant solid.

Gates (U.S. Pat. No. 3,649,426) describes the use of a dilatant dispersion consisting of small rigid particulates suspended in an environmentally stable liquid, such as glycerin. In this case, the solid-liquid dispersion is dilatant, and remains flowable in the armor material. The dilatant dispersion is confined in flexible cellular compartments which could be placed behind conventional protective armors. However, the necessity of a cellular containment structure results in a material system which is bulky, heavy, and relatively inflexible.

SUMMARY OF THE INVENTION

In light of the above background, it will be appreciated that a need exists for a fabric and articles formed therefrom having an improved ability to dissipate the kinetic energy of a moving object in comparison to known structures. The moving object can be a projectile, such as flying metal or piercing object, such as, but not limited to a knife or sword. The material alternatively can have properties of stab resistance. It is also possible that the object is not a moving but the article or person wearing the material is moving. For example, a tire of an automobile or bicycle, etc can be made of a material according to the invention and can roll over a nail, glass etc. and would not puncture because of the puncture resistance of the material.

It is a feature of the present invention to provide a fabric and articles formed therefrom comprising high strength, high modulus polymeric fibers or yarns impregnated with a fluid that exhibits shear thickening properties, herein referred to as a "shear thickening fluid" (or "STF"). The STF remains flowable after impregnation, so as to not impede fabric flexibility, but modifies the coefficient of friction between the fibers or yarns by rigidizing during an impact event.

In another embodiment according to the invention, the invention can be an article that comprises a plurality of layers. At least one of the layers is impregnated with the STF, while other layers may be unimpregnated.

According to one aspect of the present invention, a fabric for dissipating the kinetic energy of a moving object is provided. The fabric is formed by an arrangement of high tenacity polymer fibers. The fibers are impregnated with particles suspended in a solvent.

According to a more particular aspect of the present invention, a protective encasement of fiber material is provided. The fiber material comprises a plurality of high tenacity polymer fibers formed into a knitted, woven, or nonwoven fabric structure impregnated with particles suspended in a solvent. The protective encasement may include layers of such fabric surrounding a dynamic environment such as a turbine engine.

Stab and puncture resistant are used interchangeability throughout the application.

DETAILED DESCRIPTION OF THE INVENTION

Figure 1:
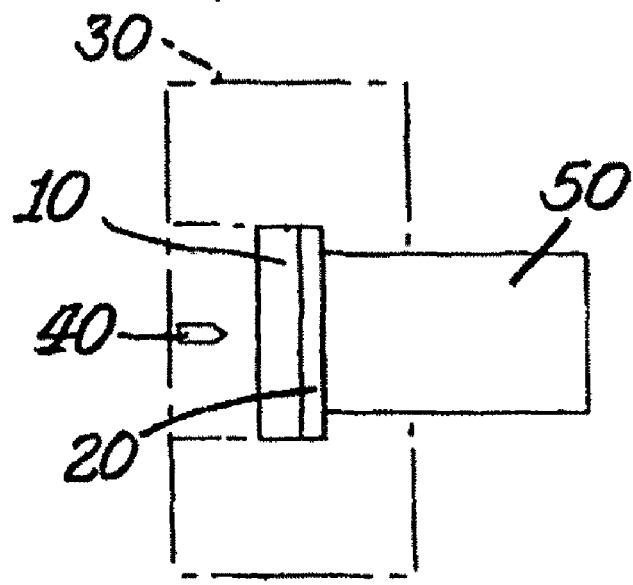
FIG. 1 illustrates a ballistic test frame and target geometry according to the invention.

The invention is directed to a material such as fabric materials and articles formed therefrom comprising high strength, high modulus polymeric fibers or yarns impregnated with a fluid, composed of particles suspended in a solvent, which undergoes a shear-thickening transition such that the coefficient of friction between the fibers or yarns is increased during an impact event.

The fabrics comprising high tenacity fibers have been incorporated as an important element in containment structures used to dissipate the kinetic energy of moving objects and thereby prevent passage of those moving objects through such containment structures to a person or structure to be protected against direct contact and damage by such moving objects. Fibers which can be used include, but are not limited to, aramid fibers such as poly (phenylenediamine terephthalamide), graphite fibers, nylon fibers, glass fibers and the like.

Nylon would have an advantage if a lighter weight and cheaper material is desired.

If the article has a plurality of layers, then each layer containing a material, preferably a ballistic material can be comprised of the same or different materials. In other words it is possible to have a plurality of layers, such as a twenty-eight layer article that contains different layers of different materials that dissipate the kinetic energy or are stab resistant or puncture resistant. For example, some of the layers can use a Kevlar® impregnated with STF, while other layers can use a different ballistic or puncture resistant material such as nylon fibers impregnated with STF and other layers can be non-impregnated Kevlar®. The outer layers closest to the body or the object being protected, do not have to be impregnated with STF. The layers impregnated with STF are preferably integrated into the article and are not just the exterior layer closest to the object or body being protected.

The STF is the combination of the particles suspended in the solvent.

The particles used can be made of various materials, such as, but not limited to, $SiO_2$ or other oxides, calcium carbonate, or polymers, such as polystyrene Or polymethylmethacrylate, or other polymers from emulsion polymerization. The particles can be stabilized in solution or dispersed by charge, Brownian motion, adsorbed surfactants, and adsorbed or grafted polymers, polyelectrolytes, polyampholytes, or oligomers. Particle shapes include spherical particles, elliptical particles, or disk-like or clay particles. The particles may be synthetic and/or naturally occurring minerals. Also, the particles can be either monodisperse, bidisperse, or polydisperse in size and shape.

Any particle that has a size less than the yarn size, which is about 1 mm, can be used. Preferably the particles should have a size less than the diameter of the fiber, which is typically 100 microns or less, so that the particles can be, impregnated and embedded in the weave of the material.

The solvents that are used can be aqueous in nature (i.e. water with or without added salts, such as sodium chloride, and buffers to control pH) for electrostatically stabilized or polymer stabilized particles, or organic (such as ethylene glycol, polyethylene glycol, ethanol), or silicon based (such as silicon oils, phenyltrimethicone). The solvents can also be composed of compatible mixtures of solvents, and may contain free surfactants, polymers, and oligomers. The solvents should be environmentally stable so that they remain integral to the fabric and suspended particles during service.

The particles are suspended in the solvent and should produce a fluid that has the shear thickening property. Shear thickening does not require a dilatant response, i.e. it may not be, associated with an increase in volume such as often observed in dry powders or sometimes in suspensions of larger particles (greater than 100 microns). The fluid may be diluted with a second solvent to enable impregnation of the fabric, and then reconcentrated through evaporation of the second solvent after impregnation, as long as the remaining impregnated fluid remains a flowable liquid with shear thickening properties.

The ballistic properties of woven fabrics, such as, but not limited to, Kevlar® fabrics, are improved through impregnation with fluids that exhibit the shear thickening effect. At low strain rates, for example associated with normal motion of the wearer of a body armor system, the fluid will offer little impediment to fabric flexure and deformation. However, at the high strain rates associated with a ballistic impact event, the fluid will increase in viscosity and in doing so, enhance the ballistic protection of the fabric. The STF used in the targets is composed of particles suspended in a solvent.

Example 1

Ballistic Performance

In the following examples silica particles (Nissan Chemicals MP4540) were suspended in ethylene glycol, at a volume fraction of approximately 0.57. The average particle diameter, as measured using dynamic light scattering, was determined to be 446 nm. Rheological measurements have shown that this STF undergoes a shear thickening transition at a shear rate of approximately $10^2$-$10^3 s^{-1}$. Additionally, this transition is reversible, i.e. this liquid-to-solid transition induced by flow is not associated with particle aggregation, nor does it result in any irreversible change in the dispersion. Full details regarding the preparation and rheological properties of the STF can be found in Lee et al., *J. Mat. Sci.*, 38 pps. 2825-2833 (2003) and Lee and Wagner *Rheol. Acta.*, 2002.

The Kevlar® fabric used in all composite target constructions was 600 denier plain-woven Hexcel-Schwebel high performance fabric Style 706 composed of Kevlar® KM-2 aramid fibers (poly-paraphenylene terephthalamide) with an areal density of 180 g/m².

Target Preparation

Figure 2:
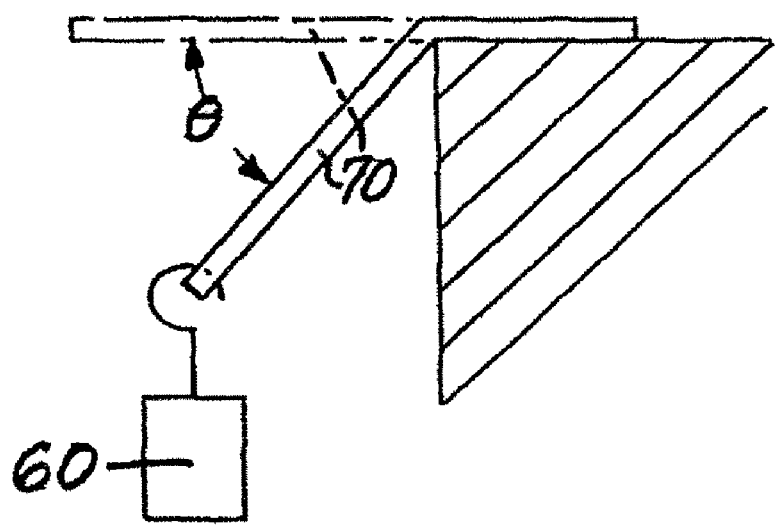
FIG. 2 illustrates flexibility test geometry that was used according to the invention.
Figure 3:
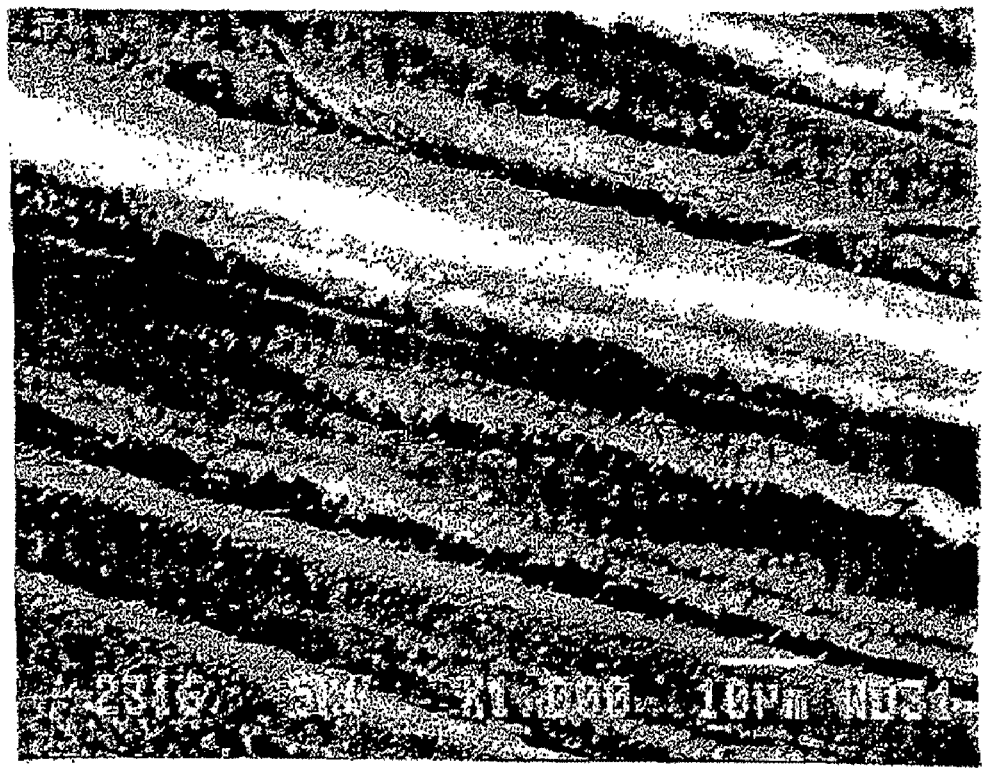
FIG. 3 illustrates Scanning Electron Microscopy ("SEM") of KEVLAR® weave impregnated with the STF fluid.

To facilitate impregnation of the STF into the KEVLAR® fabric, an equal volume of ethanol (22.0 dyne/cm) was added to the original ethylene glycol (surface tension=47.7 dyne/cm) based STF. This diluted STF was observed to spontaneously impregnate the fabric. Following impregnation, the composite fabric was heated at 80° C. for 20 minutes in a convection oven to remove the ethanol from the sample. The final composition of the impregnated STF is 57 vol % silica in ethylene glycol. Microscopy has confirmed that this process results in the full impregnation of the STF into the KEVLAR® fabric, as STF wetting is observed at the filament level (Lee et al., *J. Mat. Sci.*, 38 pps. 2825-2833 (2003)). Impregnation of the fibers with the shear thickening fluid is shown in FIG. 2 of Lee et al. which corresponds to FIG. 3 of this application. FIG. 3 of this application illustrates Scanning Electron Microscopy ("SEM") of KEVLAR® weave impregnated with the STF fluid. The figure shows silica particles dispersed within the yarn, demonstrating that the original STF was impregnated between the individual KEVLAR® fibers within each yarn. The STF was intercalated (inserted between fibrils) in the yarn as well as intercalated (inserted between yarns) in the fabric. The terms intercalated and impregnated used in the specification are synonymous.

A schematic diagram of a ballistic target is given in FIG. 1. Two pieces of 5.08 cm×5.08 cm aluminum foil (50 mm thickness) were used to encapsulate the targets 10. The Kevlar® layers were cut to 4.76 cm×4.76 cm, impregnated with varying amounts of STF per layer (2, 4, and 8 ml) as indicated, and then assembled into the targets 10. To prevent leakage of STF out of the target assembly, heat-sealed polyethylene film (Ziplock bags sealed using a ULINE KF-200HC heat sealer) was used to encapsulate the targets.

All targets 10 were backed with a backing 20. The backing 20 contained a single ply of unimpregnated Kevlar®, glued to a 5.08 cm diameter copper hoop (0.635 cm wire diameter) using Liquid Nails adhesive (ICI), in order to help support the target during testing. In all cases the glued Kevlar® layer, backing 20, was immediately adjacent to the ballistic target 10, with the copper hoop resting inside of the target mounting frame 30. All subsequent descriptions of ballistic targets 10 will list only the Kevlar® layers within the aluminum foil layers, and do not include this individual backing 20 Kevlar® layer.

Ballistic Tests

The ballistic tests were performed using a smooth bore helium gas gun. All tests were performed at room temperature. The gun was sighted on the target center and the impact velocity was adjusted to approximately 244 m/s (800 feet per second "fps"). The exact impact velocity of each projectile 40 was measured with a chronograph immediately before impacting the target 10. The projectile 40 is a NATO standard fragment simulation projectile ("FSP"), consisting of a chisel-pointed metal cylinder of 1.1 grams (17 grains) and 0.56 cm diameter (22 caliber). A 10.16 cm×10.16 cm×2.54 cm thick aluminum block 30 was cut with a recessed square hole to accept the 5.08 cm square target package as shown in FIG. 1. The target was held in place using light pressure from spring clips located along its edge. The mounting block was then clamped onto a steel frame in line with the gas gun barrel.

A clay witness 50 was used to measure the depth of indentation (NIJ standard-0101.04, 2001) (FIG. 1). Modeling clay (Van Aken International) was packed into a 15.24 cm×8.89 cm×8.89 cm wooden mold, compressed with a mallet, and cut into four 7.62 cm×4.45 cm square pieces. This process minimizes air bubbles or poor compaction in the clay witness. The molded clay block was held onto the back of the target using a strip of adhesive tape. When comparing the ballistic performance of different targets, higher performance is demonstrated by smaller measured values of depth of indentation, which indicate that more energy was absorbed by the target.

The deformation rate on the fluid during the ballistic event is estimated to be on the order of $10^4$-$10^5 s^{-1}$ (deformation rate ~$V_i$/projectile diameter=244 m/s/0.056 m). This rate is expected to be sufficient to rigidize the STF, since it exceeds the critical shear rate for the STF.

Flexibility and Thickness Tests

Two-dimensional drape tests were performed to measure the flexibility of the targets, as shown in FIG. 2. In all cases a 20 g weight 60 was used, and encapsulated ballistic targets were used as the test specimens 70. Bending angle is reported as a measure of target flexibility, with larger angles indicating greater flexibility. Target thickness at the center of the targets was also measured with a micrometer.

Results

Table 1 compares the performance of targets A, B, and C: 2 ml of STF impregnated into 4 layers of neat Kevlar, 10 layers of neat Kevlar, and 4 layers of neat Kevlar, respectively. Targets A and 13 have comparable weights. However, target A, which is an STF-Kevlar composite, exhibits better ballistic performance than target B, the neat Kevlar target. Furthermore, the STF-Kevlar composite (A) has fewer layers of Kevlar, more flexibility, and less thickness than the neat Kevlar target (B). Also note that the flexibility and thickness of targets A and C are comparable. This result demonstrates that STF addition can greatly improve the ballistic properties of Kevlar fabric, without significantly increasing its rigidity or thickness.

TABLE 1

Comparison of flexibility of various targets with comparable ballistic resistance but varying composition.

| Sample Target | Description | Sample Weight (g) | Impact Velocity (m/s) | Penetration Depth (cm) | Bending Angle, (°) | Sample Thickness (mm) |
|---|---|---|---|---|---|---|
| A | 2 ml STF impregnated in 4 layers of Kevlar ® | 4.8 | 243 | 1.23 | 51 | 1.5 |
| B | 10 layers of Kevlar ® | 4.7 | 247 | 1.55 | 13 | 3.0 |
| C | 4 layers of Kevlar ® | 1.9 | 244 | 2.12 | 50 | 1.4 |

Table 2 compares the ballistic performance of target A, which contains impregnated STF, with target D, a composite composed of ethylene glycol (a Newtonian, non-shear-thickening fluid) impregnated into Kevlar fabric. Target C, which is composed of 4 layers of Kevlar, is provided for reference. All three targets have equal numbers of Kevlar fabric layers. However, the STF-impregnated target (A) is observed to have superior ballistic resistance as compared to target D, which contains the carrier fluid without the shear thickening phenomena. In fact, target D performs comparable to target C, which is much lighter and only contains the Kevlar without carrier fluid or STF. This result shows that the shear-thickening properties of the impregnated fluid are critical to enhancing ballistic performance, and that the increase in ballistic performance is not just due to an increase in target weight.

TABLE 2

Comparison of ballistic performance of STF-impregnated Kevlar with ethylene glycol-impregnated Kevlar.

| Sample Target | Description | Sample Weight (g) | Impact Velocity (m/s) | Penetration Depth (cm) |
|---|---|---|---|---|
| A | 2 ml STF impregnated in 4 layers of Kevlar ® | 4.8 | 243 | 1.23 |
| C | 4 layers of Kevlar ® | 1.9 | 247 | 2.12 |
| D | 4 ml ethylene glycol impregnated in 4 layers of Kevlar ® | 6.3 | 246 | 2.20 |

Table 3 compares the ballistic performance of target E, which consists of 8 ml STF impregnated into 4 layers of Kevlar, with target F, which contains 8 ml of STF encased in a polyethylene film, stacked on top of 4 layers of Kevlar fabric. Both targets E and F possess the same type and quantity of STF and Kevlar. However, target E has the STF impregnated into the fabric, while target F stacks the two materials independently. The results show that the impregnated target performs better than the stacked target. This result demonstrates that impregnation of the STF into the Kevlar fabric is critical to fully realize the enhancement of ballistic performance.

TABLE 3

Comparision of ballistic performance of STF-impregnated Kevlar with STF stacked on top of neat Kevlar.

| Sample Target | Description | Sample Weight (g) | Impact Velocity (m/s) | Penetration Depth (c/m) |
|---|---|---|---|---|
| E | 8 ml STF impregnated into 4 layers of Kevlar | 13.9 | 253 | 0.673 |
| F | 8 ml of STF encapsulated, stacked on top of 4 layers of neat Kevlar | 13.9 | 247 | 1.72 |

Table 4 shows that increasing the volume of STF added to a fixed number of Kevlar fabric layers increases the ballistic resistance of the fabric. Target C is composed of 4 layers of pure Kevlar. Each following target (targets A, G, E) is impregnated with an increasing increment of 2 ml of STF. As shown in Table 4, each additional 2 ml of shear thickening fluid results in a substantial increase in ballistic resistance. This data series reinforces the result that the presence of the STF impregnated into the target has a significant beneficial effect in creating ballistic resistance.

TABLE 4

Ballistic performance of targets with 4 layers of Kevlar and different volumes of impregnated STF.

| Sample | Description | Sample Weight (g) | Impact Velocity (m/s) | Penetration Depth (cm) |
|---|---|---|---|---|
| C | 4 layers of Kevlar | 1.9 | 244 | 2.12 |
| A | 2 ml STF impregnated in 4 layers of Kevlar | 4.8 | 243 | 1.23 |
| G | 4 ml STF impregnated in 4 layers of Kevlar | 7.9 | 244 | 0.886 |
| E | 8 ml STF impregnated in 4 layers of Kevlar | 13.9 | 253 | 0.673 |

Table 5 compares the ballistic performance of targets A, G, and E, which contain Kevlar fabric with increasing amounts of impregnated STF, to targets X1, X2, and X3, which contain Kevlar fabric with increasing amounts of impregnated dry silica. Target C, which is composed of 4 layers of Kevlar, is provided for reference. All seven targets have equal numbers of Kevlar fabric layers. The dry silica targets (X1, X2, X3) have superior ballistic resistance as compared to target C, which contains only neat Kevlar fabric. However, the STF-impregnated targets (A, G, E) have superior ballistic resistance as compared to the dry silica-impregnated targets (X1, X2, X3) of comparable weight. This result shows that a flowable shear-thickening fluid impregnated into a fabric provides superior ballistic resistance as compared to fabrics reinforced by dry powders only.

TABLE 5

Comparison of ballistic performance of STF-impregnated Kevlar with dry silica-impregnated Kevlar.

| Sample Target | Description | Sample Weight (g) | Impact Velocity (m/s) | Penetration Depth (c/m) |
|---|---|---|---|---|
| C | 4 layers of Kevlar | 1.9 | 244 | 2.12 |
| A | 2 ml STF impregnated in 4 layers of Kevlar | 4.8 | 243 | 1.23 |
| G | 4 ml STF impregnated in 4 layers of Kevlar | 7.9 | 244 | 0.886 |
| E | 8 ml STF impregnated in 4 layers of Kevlar | 13.9 | 253 | 0.673 |
| X1 | 3 g dry silica impregnated in 4 layers of Kevlar | 4.9 | 252 | 1.42 |
| X2 | 6 g dry silica impregnated in 4 layers of Kevlar | 7.9 | 234 | 1.22 |
| X3 | 12 g dry silica impregnated in 4 layers of Kevlar | 13.9 | 225 | 0.89 |

Table 6 shows that varying the impregnation pattern of the target from layer-to-layer, and varying the pattern of impregnation within a single layer, can be used to enhance the ballistic performance of the fabric. Comparison of Target H to Target C demonstrates that including a few layers of Kevlar impregnated with STF can significantly enhance ballistic resistance over the equivalent number of neat Kevlar layers (Target C). Furthermore, Target I is composed of a small amount of STF impregnated into the Kevlar in a "striped" pattern. Comparison of Target I to Target J demonstrates that the impregnation of the STF into the target can be "patterned", i.e. need not be fully impregnated and still result in substantial increases in ballistic resistance. Further, comparison of the performance of Target I and Target J, both composed of 6 layers of Kevlar, shows that even a very small amount of STF impregnated into the fabric results in enhanced ballistic performance.

TABLE 6

Ballistic performance of targets with varying impregnation patterns within a fabric layer, and between fabric layers.

| Sample Target | Description | Sample Weight (g) | Impact Velocity (m/s) | Penetration Depth (cm) |
|---|---|---|---|---|
| C | 4 layers of Kevlar | 1.9 | 244 | 2.12 |
| H | 2 layers of neat Kevlar, stacked on top of 8 ml of STF impregnated into 2 layers of Kevlar | 13.9 | 242 | 0.787 |
| I | 0.22 ml of STF impregnated into 6 layers of Kevlar fabric, with a striped impregnation pattern in each fabric layer | 3.18 | 254 | 1.4 |
| J | 6 layers of Kevlar | 2.82 | 254 | 1.7 |

Table 7 shows that similar enhancements in performance have been achieved with different particles and solvents impregnated into the Kevlar® fabrics:

Table 7, sample K, which is composed of 450 nm silica particles coated with an adsorbed polymer, poly(vinyl alcohol) and dispersed in ethylene glycol, shows enhanced ballistic resistance comparable to the performance of sample A.

Table 7, sample L shows results for a shear thickening fluid composed of silica particles (450 nm) dispersed in a polymeric solvent, polyethylene glycol (PEG), where similar enhancement in ballistic performance is achieved as for the molecular ethylene glycol formulations.

Table 7, sample M shows a formulation using much smaller silica particles, 30 nm, in polyethylene glycol (PEG), which shows significant ballistic resistance that is comparable to samples with the larger particle sizes (450 nm).

Table 7, sample N shows nonspherical particles consisting of elliptically shaped calcium carbonate ellipsoidal particles in ethylene glycol. This formulation shows enhancement in ballistic resistance comparable to the spherical particles.

As shown the STFs can vary in carrier fluid type, particle type, and surface functionalization, but all STFs tested successfully enhance ballistic performance.

TABLE 7

Ballistic performance of impregnated Kevlar targets with different types of STF.

| Sample Target | Description | Sample Weight (g) | Impact Velocity (m/s) | Penetration Depth (cm) |
|---|---|---|---|---|
| A | 2 ml STF (450 nm spherical silica in ethylene glycol) impregnated into 4 layers of Kevlar | 4.8 | 243 | 1.23 |
| K | 2 ml STF (450 nm polymer-stabilized spherical silica in ethylene glycol) | 4.9 | 259 | 0.74 |

TABLE 7-continued

Ballistic performance of impregnated Kevlar targets with different types of STF.

| Sample Target | Description | Sample Weight (g) | Impact Velocity (m/s) | Penetration Depth (cm) |
|---|---|---|---|---|
| | impregnated into 4 layers of Kevlar | | | |
| L | 2 ml STF (450 nm spherical silica in polyethylene glycol) impregnated into 4 layers of Kevlar | 4.9 | 246 | 1.8 |
| M | 2 ml STF (30 nm spherical silica in polyethylene glycol) impregnated into 4 layers of Kevlar | 5.3 | 331 | 1.57 |
| N | 1.6 ml STF (anisotropic CoCO3 particles in ethylene glycol) impregnated into 4 layers of Kevlar | 4.8 | 244 | 0.48 |

Example 2

Stab Performance

In the following examples silica particles (Nippon Shokubai Seahostar KE-P50) were suspended in polyethylene glycol, at a volume fraction of approximately 0.52. The average particle diameter, as measured using dynamic light scattering, was determined to be 450 nm. The Kevlar fabric used was 600 denier plain-woven Hexcel-Schwebel high performance fabric Style 706 composed of Kevlar® KM-2 aramid fibers (poly-paraphenylene terephthalamide) with an areal density of 180 g/m².

Two targets are compared: 15 layers of neat Kevlar fabric, with an areal density of 2670 g/m², and 12 layers of STF-Kevlar, with an areal density of 2650 g/m². The STF-Kevlar sample was prepared according to the methods in Example 1. Note that both targets have comparable areal densities. The neat Kevlar sample is approximately 25.4 cm×35.6 cm, while the STF-Kevlar sample is approximately 50.8 cm×35.6 cm.

Stab resistance measurements were performed using an end effector fabricated according to the "spike" specifications of the U.S. National Institute of Justice (NIJ) standard 115.00 (2000), This end effector models an ice pick or other puncturing threat, which are representative of the types of improvised weapons often encountered by correctional officers. The end effector was mounted to a variable drop mass at a height of 10 cm in a drop tower, so that all impacts occur at a velocity of approximately 1.4 m/s.

The target is placed on top of a multi-layer foam backing, arranged according to NIJ standard 115.00 (2000). This backing consists of four layers of 5.8-mm-thick neoprene sponge (SCE45B from Rubberlite Inc.), followed by one layer of 31-mm-thick polyethylene foam (LD45 from Rubberlite Incorporated), followed by two layers of 6-mm-thick rubber (Duromater Rubber from PCF Foam Corp.). One layer of witness paper is placed immediately behind the target (on top of the foam backing), with four additional witness paper layers placed behind each of the four layers of neoprene sponge. The witness paper used is 140 g/m² synthetic paper from Polyart.

For each test, the weighted spike is dropped onto the target. The witness papers are then inspected to determine how many layers of witness paper were punctured by the spike. Fewer layers of punctured witness paper indicates superior puncture resistance for the armor target. Note that the maximum number of witness paper layers that can be penetrated is 5 (the total number of witness paper layers).

Table 8 compares the stab results for the neat and STF-Kevlar samples. For the neat Kevlar sample, witness papers are penetrated at all energy levels, with increasing penetration as impact energy increases. Note that, at energy levels of 3.30 J and above, all 5 layers of witness paper are penetrated. In contrast, the STF-Kevlar sample prevents penetration of the witness papers at all energy levels. Note that, for the STF-Kevlar targets, the first layer of witness paper is never penetrated, indicating that the spike does not penetrate through the armor target. Also note that the areal densities of the neat Kevlar and STF-Kevlar are comparable, so that the STF-Kevlar is exhibiting superior stab resistance relative to neat Kevlar on a per-weight basis.

TABLE 8

Stab performance of neat Kevlar and STF-impregnated Kevlar targets at different impact energies. All tests use a drop height of 10 cm, and the NIJ "spike" end effector.

| Sample Target | Description | Sample Areal Density (g/m²) | Drop Mass (kg) | Impact Velocity (m/s) | Impact Energy (J) | Number of Witness Papers Penetrated |
|---|---|---|---|---|---|---|
| O | 15 layers of neat Kevlar | 2670 | 2.33 | 1.35 | 2.13 | 3 |
| P | 15 layers of neat Kevlar | 2670 | 2.74 | 1.29 | 2.28 | 4 |
| Q | 15 layers of neat Kevlar | 2670 | 3.14 | 1.35 | 2.88 | 4 |
| R | 15 layers of neat Kevlar | 2670 | 3.60 | 1.35 | 3.30 | 5 |
| S | 15 layers of neat Kevlar | 2670 | 4.01 | 1.35 | 3.66 | 5 |
| T | 15 layers of neat Kevlar | 2670 | 4.47 | 1.35 | 4.09 | 5 |
| U | 12 layers of STF-Kevlar | 2650 | 2.33 | 1.44 | 2.42 | 0 |
| V | 12 layers of STF-Kevlar | 2650 | 2.74 | 1.44 | 2.82 | 0 |
| W | 12 layers of STF-Kevlar | 2650 | 3.14 | 1.44 | 3.24 | 0 |

TABLE 8-continued

Stab performance of neat Kevlar and STF-impregnated Kevlar targets at different impact energies. All tests use a drop height of 10 cm, and the NIJ "spike" end effector.

| Sample Target | Description | Sample Areal Density (g/m$^2$) | Drop Mass (kg) | Impact Velocity (m/s) | Impact Energy (J) | Number of Witness Papers Penetrated |
|---|---|---|---|---|---|---|
| X | 12 layers of STF-Kevlar | 2650 | 3.60 | 1.44 | 3.74 | 0 |
| Y | 12 layers of STF-Kevlar | 2650 | 4.01 | 1.44 | 4.14 | 0 |
| Z | 12 layers of STF-Kevlar | 2650 | 4.47 | 1.44 | 4.63 | 0 |

The material can be used for advanced body armor, airbags, protective material, such as for engines and turbines or anywhere that there is a desire to dissipate the kinetic energy of a moving object. The material can also be used for bomb blankets, tank skirts, stowable vehicle armor, inflatable protective devices, tents, seats or cockpits, storage and transport of luggage, storage and transport of munitions, and sporting goods or protective sports apparel. The material can be used to fashion protective apparel or clothing, such as jackets, gloves, motorcycle protective clothing, including jackets and hunting gaitors, chaps, pants, boots, which could stiffen to provide bodily protection against blasts, such as those caused by exploding land mines, and sudden impacts, such as those incurred upon landing by parachute, or in accidents. The material would have stab resistance properties and can be used to provide bodily protection against sharp instruments, such as knives, picks, or swords used in hand-to-hand combat. The material also can be incorporated inside a helmet to protect the head, such as motorcycle helmets, bicycle helmets, athletic helmets (football, lacrosse, ice-hockey etc). The material can also be used for industrial safety clothing for protecting workers in environments where sharp objects or projectiles could be encountered. The material can also be used for covering industrial equipment, such as equipment with high-speed rotating components, which could generate and release projectiles upon catastrophic equipment failure. The material can also be used as shrouding over aircraft engines, to protect the aircraft and its occupants upon catastrophic failure of the engine. The material can also be used as a spall liner for vehicles such as automobiles, aircraft, and boats, to protect the vehicle occupants by containing projectiles generated by a blunt or ballistic impact on the outside of the vehicle, The material could also be used for puncture-resistant protective clothing for fencing participants. The material could also be used in belts and hosing for industrial and automotive applications, Fibre optic and electromechanical cables,
Friction linings (such as clutch plates and brake pads),
Gaskets for high temperature and pressure applications,
Adhesives and sealants,
Flame-resistant clothing,
composites,
asbestos replacement,
hot air filtration fabrics,
mechanical rubber goods reinforcement,
ropes and cables and
sail cloth.

All the references described above are incorporated by reference in their entirety for all useful purposes.

As can be seen from the above description, the present invention provides an improved fabric for use in dissipating the kinetic energy of a moving article. While the examples illustrate that the moving article is a bullet or a spike, the moving article could also be flying fragments, from an explosion, or a sharp instrument, such as a knife or sword thrusted into the wearer of the material or a stationary sharp article just penetrating the material.

While specific preferred embodiments and materials have been illustrated, described, and identified, it is to be understood that the invention is in no way limited thereto, since modifications may be made and other embodiments of the principles of this invention will occur to those of skill in the art to which this invention pertains. Therefore, it is contemplated to cover any such modifications and other embodiments as incorporate the features of this invention within the full lawful scope of allowed claims as follows.

We claim:

1. A process of preventing an object to penetrate a person or structure which comprises covering said person or said structure with a material so that at least part of said person or at least part of said structure is covered with said material and subjecting said material to an object to so that said person or said structure is moving,
said object is moving or
both said object and said person or said structure is moving
so that the object partially penetrates said material and wherein said material comprises a fabric or a yarn which further comprises a shear thickening fluid (STF) intercalated into said fabric and/or yarn wherein said STF remains in a fluid form and said STF comprises particles suspended in a solvent and said particle-solvent suspension remains in a flowable form after intercalation and said solvent is environmentally stable and remains integral to said material and said suspended particles during service.

2. The process as claimed in claim 1, wherein said moving object is a flying metal or a piercing object.

3. The process as claimed in claim 2, wherein said moving object is a knife, sword or spike.

4. The process as claimed in claim 3, wherein said moving object is a flying metal.

5. The process as claimed in claim 1, wherein said material is a ballistic material which contains aramid fibers, graphite fibers, nylon fibers or glass fibers.

6. The process as claimed in claim 1, wherein said particles are oxides, calcium carbonate, synthetically occurring minerals, naturally occurring minerals, polymers or a mixture thereof.

7. The process as claimed in claim 1, wherein said solvent is water, which optionally contains added salts, surfactants, and/or polymers and said material is a poly (para-phenylene terephthalamide).

8. The process as claimed in claim 1, wherein said solvent is ethylene glycol, polyethylene glycol, ethanol, silicon oils, phenyltrimethicone or a mixture thereof and said material is a poly (para-phenylene terephthalamide).

9. The process as claimed in claim 1, wherein said particles are $SiO_2$, polystyrene or polymethylmethacrylate.

10. The process as claimed in claim 1, wherein said particles have an average diameter size of less than 1 mm.

11. The process as claimed in claim 1, wherein said particles have an average diameter size of less than 100 microns.

12. The process as claimed in claim 1, wherein the material comprises one or more layers of said material and said at one or more layers are a woven fabric.

13. The process as claimed in claim 1, wherein the material comprises one or more layers of said material and said at one or more layers are a nonwoven fabric.

14. The process as claimed in claim 1, wherein the material comprises one or more layers of said material and said at one or more layers are a knitted fabric.

15. The process as claimed in claim 1, wherein the fabric or yarn is nylon.

16. The process as claimed in claim 1, wherein said fabric or yarn is a polymeric fiber or yarn.

17. The process as claimed in claim 1, wherein said particles are $SiO_2$, polystyrene or polymethylmethacrylate and said solvent is water, which optionally contains added salts, surfactants, and/or polymers and said material is a poly (para-phenylene terephthalamide).

18. The process as claimed in claim 17, wherein said particles have an average diameter size of less than 100 microns.

* * * * *